United States Patent
Enis et al.

(10) Patent No.: US 10,072,646 B2
(45) Date of Patent: Sep. 11, 2018

(54) METHOD AND APPARATUS FOR USING WIND ENERGY OR SOLAR ENERGY FOR AN UNDERWATER AND/OR FOR AN UNDER SEABED COMPRESSED AIR ENERGY STORAGE SYSTEM

(75) Inventors: Ben M. Enis, Henderson, NV (US); Paul Lieberman, Torrance, CA (US)

(73) Assignee: EnisEnerGen LLC., Henderson, NV (US)

( * ) Notice: Subject to any disclaimer, the term of this patent is extended or adjusted under 35 U.S.C. 154(b) by 234 days.

(21) Appl. No.: 13/610,044

(22) Filed: Sep. 11, 2012

(65) Prior Publication Data
US 2014/0183869 A1    Jul. 3, 2014

(51) Int. Cl.
| | |
|---|---|
| F03D 9/00 | (2016.01) |
| F04B 23/02 | (2006.01) |
| H02S 10/12 | (2014.01) |
| F03D 9/28 | (2016.01) |
| F03D 9/25 | (2016.01) |
| F03D 9/17 | (2016.01) |

(52) U.S. Cl.
CPC .............. *F04B 23/02* (2013.01); *F03D 9/007* (2013.01); *F03D 9/17* (2016.05); *F03D 9/25* (2016.05); *F03D 9/28* (2016.05); *H02S 10/12* (2014.12); *F05B 2240/95* (2013.01); *F05B 2260/42* (2013.01); *Y02E 10/725* (2013.01); *Y02E 60/15* (2013.01)

(58) Field of Classification Search
CPC .............. F05B 2210/12; F05B 2210/18; F05B 2220/3023; F05B 2220/60
USPC .............. 290/43, 54, 1 A, 2, 55; 60/641.11, 60/641.12
See application file for complete search history.

(56) References Cited

U.S. PATENT DOCUMENTS

| | | | | |
|---|---|---|---|---|
| 4,490,232 A * | 12/1984 | Lapeyre | ......................... | 204/278 |
| 6,100,600 A * | 8/2000 | Pflanz | ............................. | 290/54 |
| 7,067,937 B2 * | 6/2006 | Enish et al. | ..................... | 290/55 |
| 7,504,739 B2 * | 3/2009 | Enis et al. | ....................... | 290/54 |
| 2006/0055175 A1 * | 3/2006 | Grinblat | .................. | F03B 13/26 290/54 |
| 2006/0137349 A1 * | 6/2006 | Pflanz | ....................... | F03G 6/06 60/641.2 |
| 2007/0234749 A1 * | 10/2007 | Enis et al. | .................... | 62/238.2 |
| 2007/0295673 A1 * | 12/2007 | Enis et al. | .................... | 210/766 |

(Continued)

*Primary Examiner* — Julio Gonzalez
(74) *Attorney, Agent, or Firm* — Mu P.C.

(57) ABSTRACT

The invention uses wind turbine and/or solar energy to enhance the efficiency of an underwater and/or underwater in-soil bed of a compressed air energy storage system. The apparatus comprises a wind turbine and/or a photovoltaic panel to drive an onshore compressor, which provides compressed air energy into an underwater pressure vessel. The buoyant rigid-wall pressure vessel will be located and restrained under water or in-soil underwater. The pressure vessel may be horizontal or in vertical configurations as well as parallel or in perpendicular orientation to the shoreline. The pressure vessel may be constructed of high compression strength reinforced concrete or reinforced fiber plastic material that need not have a high thermal capacitance or high thermal conductivity because the exhaust from the pressure vessel feed a near constant air temperature to the turboexpander on the surface via several long vertical small diameter pipes through the 50° to 70° F. water.

17 Claims, 14 Drawing Sheets

Rigid Wall Underwater CAES System, UW-CAES

(56) References Cited

U.S. PATENT DOCUMENTS

| | | | |
|---|---|---|---|
| 2008/0136186 A1* | 6/2008 | Gogoana et al. | 290/43 |
| 2009/0205364 A1* | 8/2009 | Enis | B01D 53/73 62/604 |
| 2009/0230696 A1* | 9/2009 | Enis | F02C 1/02 290/1 B |
| 2010/0107621 A1* | 5/2010 | Garvey | F03D 1/065 60/327 |
| 2010/0183903 A1* | 7/2010 | McGinnis et al. | 429/50 |
| 2011/0169275 A1* | 7/2011 | Garvey | F02C 1/02 290/1 R |

* cited by examiner

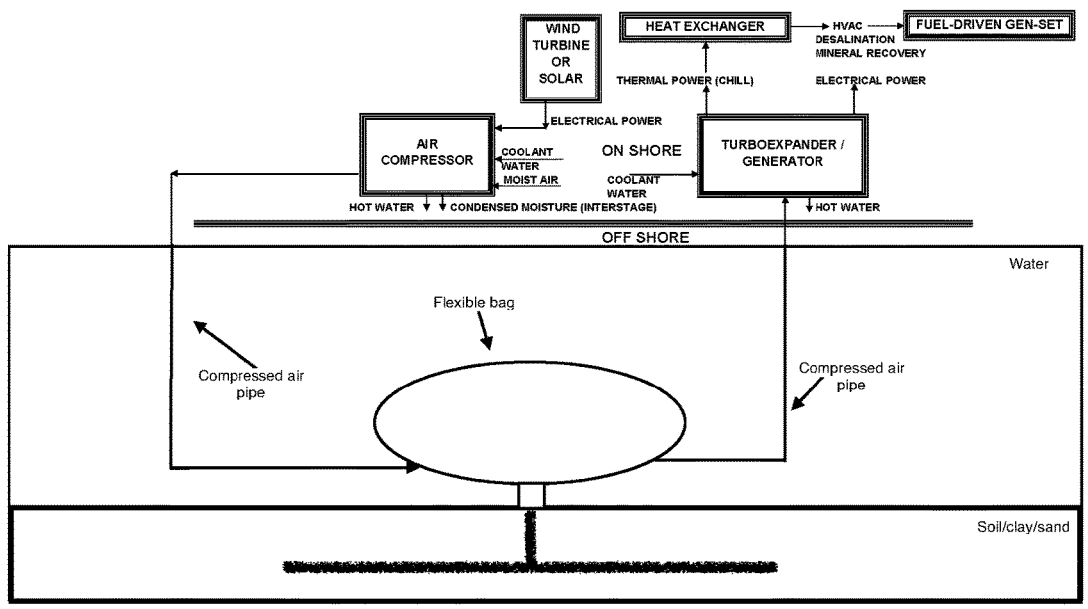
FIG 1. Existing Technology Flexible Bag Ocean Compressed Air Energy Storage (OCAES) System

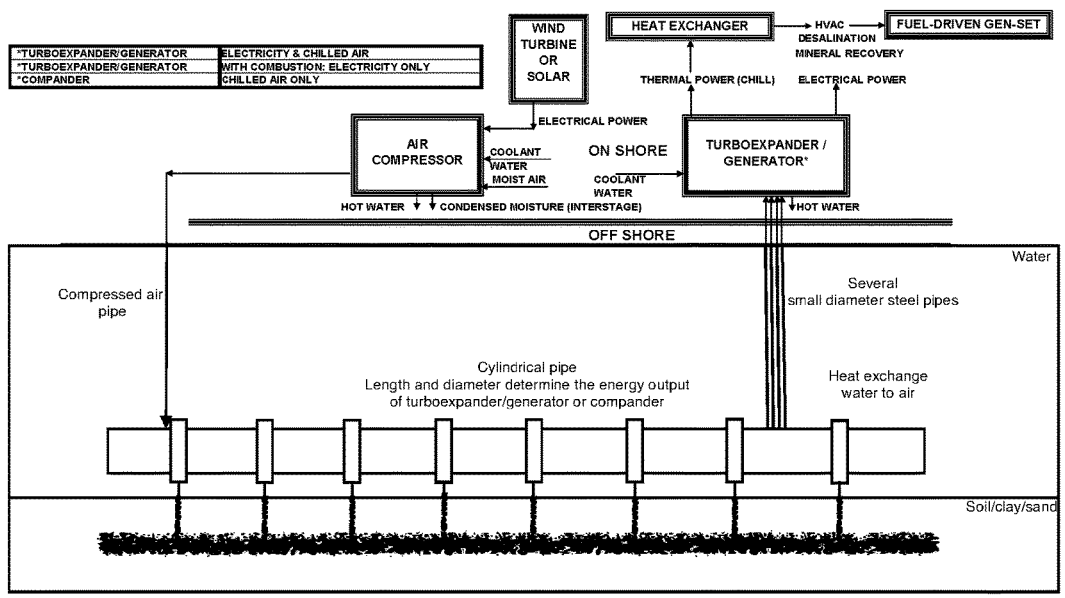
FIG 2. Rigid Wall Underwater CAES System, UW-CAES

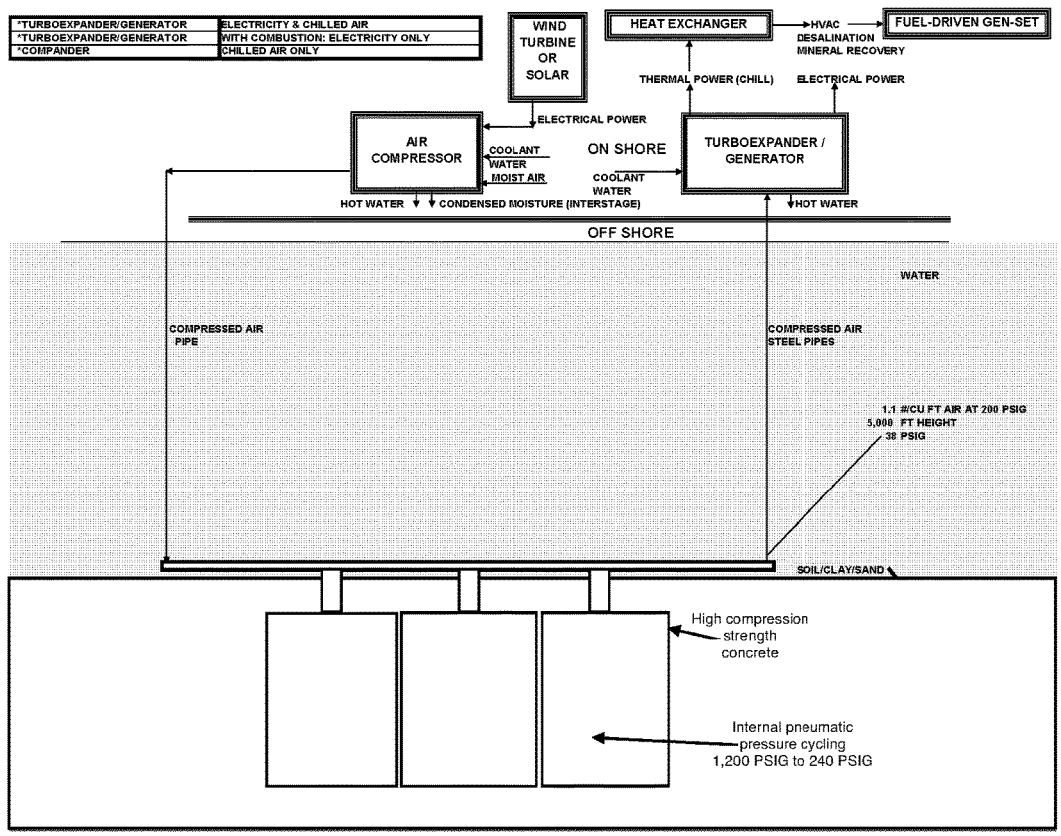
FIG 3. Rigid Wall Underwater In-Soil UW-CAES System

|  | Under ground Huntorf Germany | Under ground McIntosh Alabama | Under ground Norton Ohio |
|---|---|---|---|
| COMMISSIONED | 1978 | 1991 | 2006 |
| COMPRESSOR (MW) | 60 | 53 |  |
| COMPRESSOR OPERATION (HOURS) | 8 | 41.6 |  |
| TURBOEXPANDER (MW electrical) | 290 | 110 | 2700 |
| DAY TIME OPERATION (HOURS) | 2 | 26 | 16 |
| CHILLED AIR (MW thermal) | 0 | 0 |  |
| VOLUME (CU FT) | 10,594,400 | 18,716,773 | 353,146,667 |
| MAXIMUM PRESSURE (PSIG) | 1015 | 1073 | 1600 |
| MINIMUM PRESSURE (PSIG) | 625 | 625 | 800 |
| FUEL COST (kJ/kWh), low | 4380 | 4,819 |  |
| FUEL COST (kJ/kWh), high | 4570 |  |  |

FIG 4. Existing Underground Cavern Compressed Air Energy Storage Systems

GE OIL & GAS OPERATIONS, LLC.
ROTOFLOW
Los Angeles, CA

| Stage | | 1 | 2 | 3 | 4 | 5 | 6 | 7 | 8 |
|---|---|---|---|---|---|---|---|---|---|
| Molecular Weight | | 28.96 | 28.96 | 28.96 | 28.96 | 28.96 | 28.96 | 28.96 | 28.96 |
| Inlet: P1 | (PSIA) | 14.67 | 28.45 | 54.76 | 105.40 | 202.86 | 390.44 | 718.89 | 1240.42 |
| T1 | (°F) | 68.00 | 75.00 | 75.00 | 75.00 | 75.00 | 75.00 | 75.00 | 75.00 |
| Outlet: P2 | (PSIA) | 28.74 | 55.32 | 106.47 | 204.91 | 394.38 | 726.15 | 1252.95 | 2014.67 |
| T2 | (°F) | 218.06 | 225.06 | 225.06 | 225.06 | 225.06 | 225.06 | 224.18 | 224.18 |
| Flow: | (SCFM) | 6,600 | 6,600 | 6,600 | 6,600 | 6,600 | 6,600 | 6,600 | 6,600 |
| RPM | | 25,000 | 25,000 | 45,000 | 45,000 | 45,000 | 45,000 | 45,000 | 45,000 |
| EfficiencY | (%) | 75.0% | 75.0% | 75.0% | 75.0% | 75.0% | 70.0% | 63.0% | 55.0% |
| Wheel Power | (hp) | 440 | 440 | 440 | 440 | 440 | 440 | 437 | 437 |

FIG 5. Multiple Stage Air Compressor Properties with Coolant Water Interstage Moisture Condensation

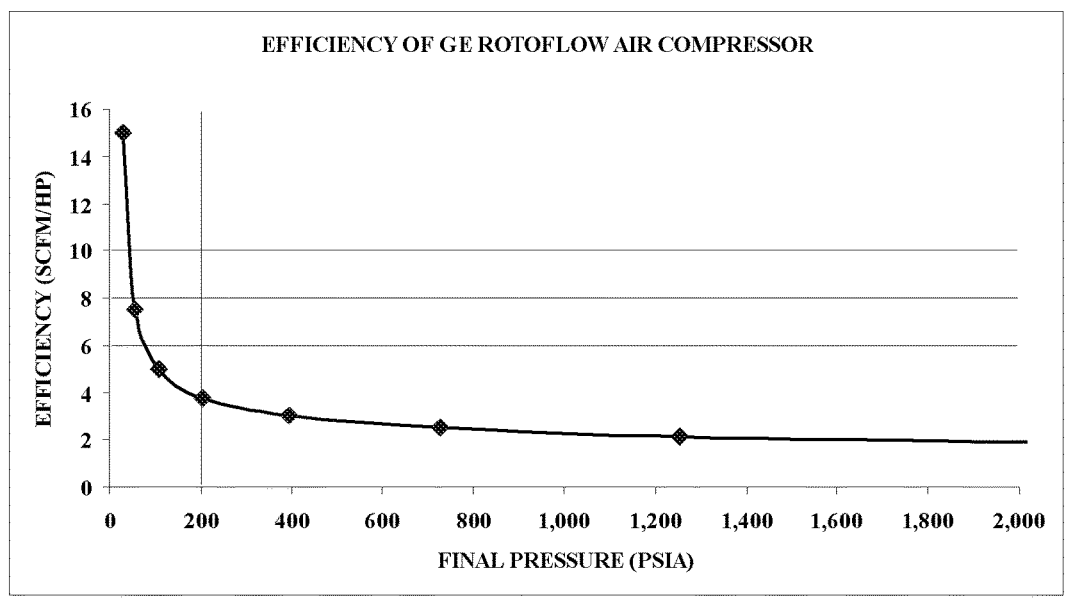
FIG 6. Efficiency of Multi-Stage Compressor as a Function of Final Pressure

500 PSIG (1,125 FT DEEP) HYDROSTATIC PRESSURE
2,000 KW AIR COMPRESSOR

| SCENARIO | NUMBER OF PIPES | FLOW (SCFM) | PRESSURE (PSIA) | DENSITY (#/CU FT) | DIAMETER (FT) | VELOCITY (FT/SEC) | LENGTH (FT) | FRICTION FACTOR | PRESSURE DROP PER PIPE (PSI) | |
|---|---|---|---|---|---|---|---|---|---|---|
| #1A | 1 | 5,362.93 | 1,214.67 | 6.22 | 0.2 | 34.3 | 1,125 | 0.02 | 88.9 | |
| #1B | 1 | 10,054 | 214.67 | 1.10 | 0.2 | 364.2 | 1,125 | 0.02 | 1,767.2 | NO GOOD |
| #2A | 4 | 1,341 | 1,214.67 | 6.22 | 0.2 | 8.6 | 1,125 | 0.02 | 5.6 | |
| #2B | 4 | 2,513 | 214.67 | 1.10 | 0.2 | 91.0 | 1,125 | 0.02 | 110.5 | NO GOOD |
| #3A | 16 | 335 | 1,214.67 | 6.22 | 0.2 | 2.1 | 1,125 | 0.02 | 0.3 | |
| #3B | 16 | 628 | 214.67 | 1.10 | 0.2 | 22.8 | 1,125 | 0.02 | 6.9 | |

1,000 PSIG (2,225 FT DEEP) HYDROSTATIC PRESSURE
2,000 KW AIR COMPRESSOR

| SCENARIO | NUMBER OF PIPES | FLOW (SCFM) | PRESSURE (PSIA) | DENSITY (#/CU FT) | DIAMETER (FT) | VELOCITY (FT/SEC) | LENGTH (FT) | FRICTION FACTOR | PRESSURE DROP PER PIPE (PSI) | |
|---|---|---|---|---|---|---|---|---|---|---|
| #1A | 1 | 5,362.93 | 1,214.67 | 6.22 | 0.2 | 34.3 | 2,250 | 0.02 | 177.7 | |
| #1B | 1 | 10,054 | 214.67 | 1.10 | 0.2 | 364.2 | 2,250 | 0.02 | 3,534.5 | NO GOOD |
| #2A | 4 | 1,341 | 1,214.67 | 6.22 | 0.2 | 8.6 | 2,250 | 0.02 | 11.1 | |
| #2B | 4 | 2,513 | 214.67 | 1.10 | 0.2 | 91.0 | 2,250 | 0.02 | 220.9 | NO GOOD |
| #3A | 16 | 335 | 1,214.67 | 6.22 | 0.2 | 2.1 | 2,250 | 0.02 | 0.7 | |
| #3B | 16 | 628 | 214.67 | 1.10 | 0.2 | 22.8 | 2,250 | 0.02 | 13.8 | |

1,500 PSIG (3,375 FT DEEP) HYDROSTATIC PRESSURE
3,125 KW AIR COMPRESSOR

| SCENARIO | NUMBER OF PIPES | FLOW (SCFM) | PRESSURE (PSIA) | DENSITY (#/CU FT) | DIAMETER (FT) | VELOCITY (FT/SEC) | LENGTH (FT) | FRICTION FACTOR | PRESSURE DROP PER PIPE (PSI) | |
|---|---|---|---|---|---|---|---|---|---|---|
| #1A | 1 | 5,362.93 | 1,214.67 | 6.22 | 0.2 | 34.3 | 3,375 | 0.02 | 266.6 | |
| #1B | 1 | 10,054 | 214.67 | 1.10 | 0.2 | 364.2 | 3,375 | 0.02 | 5,301.7 | NO GOOD |
| #2A | 4 | 1,341 | 1,214.67 | 6.22 | 0.2 | 8.6 | 3,375 | 0.02 | 16.7 | |
| #2B | 4 | 2,513 | 214.67 | 1.10 | 0.2 | 91.0 | 3,375 | 0.02 | 331.4 | NO GOOD |
| #3A | 16 | 335 | 1,214.67 | 6.22 | 0.2 | 2.1 | 3,375 | 0.02 | 1.0 | |
| #3B | 16 | 628 | 214.67 | 1.10 | 0.2 | 22.8 | 3,375 | 0.02 | 20.7 | |

FIG 7. Pressure Drop in Pipes (Length and Diameter) from Compressor to Pressure Vessel

THERMODYNAMICS OF A 1,000 kWe TURBOEXPANDER

| Air | PRESSURE PSIA | TEMP DEG F | DENSITY #/CU FT | ENTHALPY BTU/# | ENTROPY BTU/(# R) | CONSTANT VOLUME SP. HEAT BTU/(# R) | CONSTANT PRESSURE SP HT BTU/(# R) | SOUND SPEED (FT/SEC) |
|---|---|---|---|---|---|---|---|---|
| INPUT | 200 | 70 | 1.0235 | 125.42 | 1.4552 | 0.1724 | 0.24571 | 1133.7 |
| ISENTROPIC EXPANSION | 14.67 | -210.22 | 0.15997 | 59.225 | 1.4552 | 0.17164 | 0.24249 | 771.66 |
|  |  |  |  | 66.195 |  |  |  |  |
| EFFICIENCY |  |  |  | 0.85 | EFFICIENCY |  |  |  |
|  |  |  |  | 69.15425 |  |  |  |  |
| OUTPUT | 14.67 | -169.18 | 0.13695 | 69.154 | 1.4921 | 0.17137 | 0.24149 | 834.18 |

|  |  | 10.05 | SCFM/HP (electrical) |
|---|---|---|---|
|  |  | 1,020 | kW(thermal) |

| | | | | | | | | |
|---|---|---|---|---|---|---|---|---|
| 200 | 70 | 1.0235 | 125.42 | 1.4552 | 0.1724 | 0.24571 | 1133.7 |
| 14.67 | -210.22 | 0.15997 | 59.225 | 1.4552 | 0.17164 | 0.24249 | 771.66 |
|  |  |  | 66.195 |  |  |  |  |
|  |  |  | 0.90 | EFFICIENCY |  |  |  |
|  |  |  | 65.8445 |  |  |  |  |
| 14.67 | -182.88 | 0.14385 | 65.844 | 1.4804 | 0.17144 | 0.24175 | 813.89 |

|  |  | 9.49 | SCFM/HP (electrical) |
|---|---|---|---|
|  |  | 1,018 | kW(thermal) |

FIG 8. 85% and 90% Turboexpander Efficiencies with Resultant Air Properties

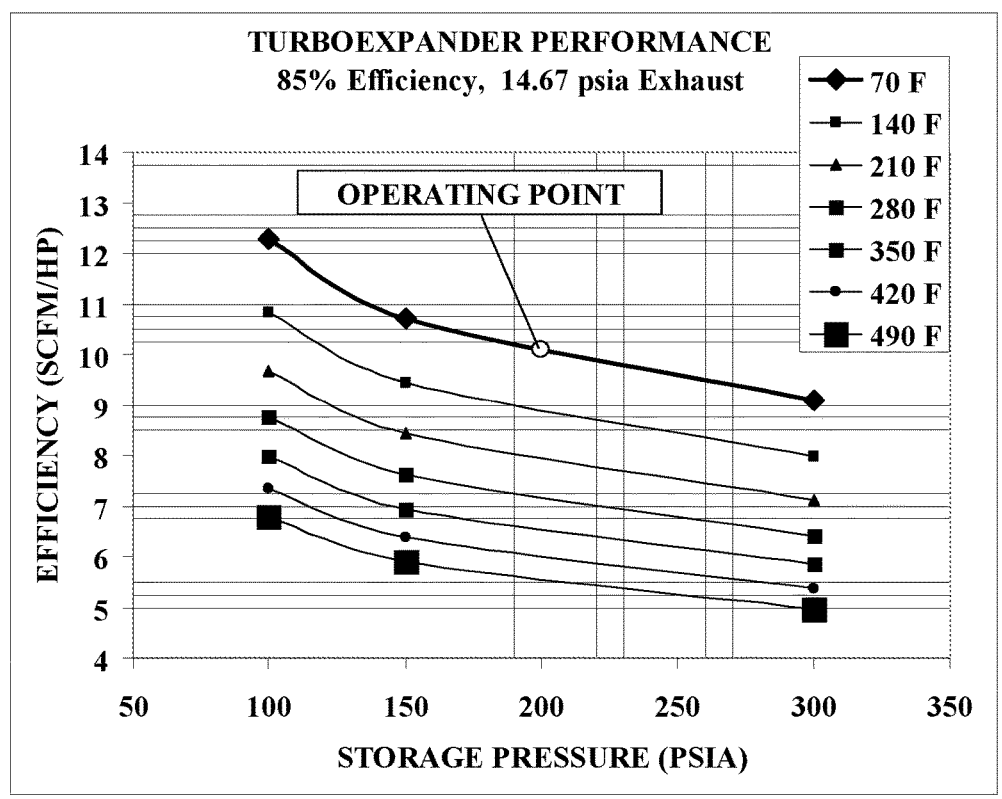
FIG 9. Turboexpander Efficiencies as a Function of Inlet Air Pressures and Temperatures

| | |
|---|---|
| COMPRESSOR | TURBOEXPANDER |
| INITIAL CONDITION | |
| 2 SCFM/HP @ 1,200 PSIG | 9.9 SCFM/HP @ 200 PSIG |
| 23,500 CF @ 1,214.67 PSIA | 1,000 kWe |
| 1,945,790 SCF @14.67 PSIA | 1,340.48 HP |
| 2,000 KW | 13,271 SCFM |
| 1,340.48 HP | 1,812,820.04 SCF BETWEEN CYCLES |
| 2,681 SCFM | 2.3 HOURS |
| 726 MIN | |
| 12.1 HOURS | ROUND TRIP ENERGY EFFICIENCY |
| | 29% for electrical power |
| FINAL CONDITION | 58% for electrical and thermal power |
| 3.75 SCFM/HP @ 200 PSIG | USEFUL HOT WATER GENERATED |
| 23,500 CF @ 1,214.67 PSIA | NOT INCLUDED |
| 1,945,790 SCF @14.67 PSIA | |
| 2,000 KW | |
| 1,340.48 HP | |
| 5,027 SCFM | |
| 387 MIN | |
| 6.5 HOURS AT INITIAL LOW PRESSURE COMPRESSION | |

132,970.35 CF @214.67 PSIA
AVERAGE CONDITION BETWEEN 200 AND 1,200 PSIG
   1,812,820 SCF PUMPING REQUIRED BETWEEN CYCLES
     3,854 SCFM AVERAGE BETWEEN 200 AND 1,200 PSIG
       7.8 HOURS FROM 200 TO 1,200 PSIG 23,500 CU FT AT HIGH PRESSURE
        4 FT INSIDE DIAMETER
 1,870.07 FT LONG CYYLINDER
       81 FT LENGTH CYLINDERS
       23 CYLINDERS

FIG 10. Performance Calculation for 2000 kWe Air Compressor Operation for ~7.8 Hours Delivery of 1,812,820 SCF and that Delivers 1,000 kWe Electricity and 1,000 kWt Thermal Power for 2.3 hours

|    | DEPTH (FT) | WATER HYDROSTATIC PRESSURE (PSIG) | AIR INTERNAL PRESSURE (PSIG) | DIFFERENCE IN PRESSURE (PSIG) | REINFORCED CONCRETE COMPR/TENS STRENGTH (PSIG) | REQUIRED CIRCULAR WALL THICKNESS (INCHES) | WEIGHT PER FOOT (POUNDS) | BUOYANT FORCE (POUNDS) | BALLAST REQUIRED |
|----|------|------|------|------|------|------|------|------|-----|
| 1A | 2250 | 1000 | 1200 | -200 | -500 | 9.6 | 1,810 | 3,318 | NO |
| 1B | 2250 | 1000 | 200  | 800  | 5000 | 3.84 | 651 | 1,784 | YES |
| 2A | 3375 | 1500 | 1200 | 300  | 5000 | 1.44 | 233 | 1,285 | YES |
| 2B | 3375 | 1500 | 200  | 1300 | 5000 | 6.24 | 1,108 | 2,366 | YES |
| 3A | 4500 | 2000 | 1200 | 800  | 5000 | 3.84 | 651 | 1,784 | YES |
| 3B | 4500 | 2000 | 200  | 1800 | 5000 | 8.64 | 1,601 | 3,029 | YES |

| DEPTH (FT) | INNER DIAMETER (FT) | WALL THICKNESS (INCHES) | BALLAST REQUIRED |
|------|---|----|----|
| 2250 | 4 | 19 | NO |
| 3375 | 4 | 13 | NO |
| 4500 | 4 | 18 | NO |

FIG 11. Per-Foot Weight of Underwater Concrete Cylinders above Seabed Floor versus Upward Buoyancy Force of Displaced Seawater

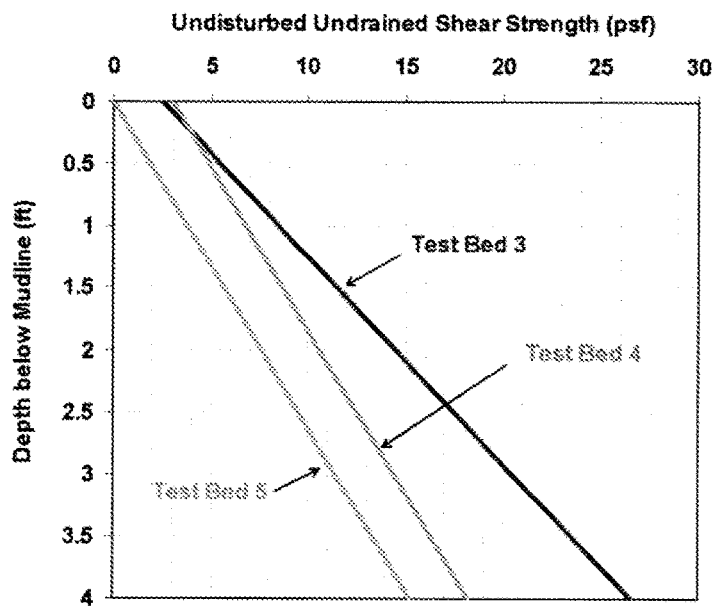
Robert B. Gilbert, Maurice Morvant and Jean Audibert, Torpedo Piles Joint Industry Project - Model Torpedo Pile Tests in Kaolinite Test Beds, The University of Texas at Austin, March 2008.
FIG 12. Shear Strength Data for Kaoline Clay for Application to Pile Vertical Pull Out Force

| At 4 ft Depth | At 450 Feet Depth (200 psig hydrostatic) |
|---|---|
| 15 psf Shear Strength | 1,688 psf Shear Strength at depth |
| 1 ft long circular cylinder | 1 ft long circular cylinder |
| 6 feet diamter | 6 feet diamter |
| 1 cylinder | 1 cylinder |
| 19 square feet area | 19 square feet area |
| 283 pull out force required for vertical cyclinder | 31,809 pull out force required for vertical cyclinder |

FIG 13. Vertical Cylinders Require >450 feet Burial Depth to Avoid Any Ballast Requirement (Figure 11)

500 PSIG (1,125 FT DEEP) HYDROSTATIC PRESSURE
1,000 KWe AIR TURBOEXPANDER/GENERATOR SET

| SCENARIO | NUMBER OF PIPES | FLOW (SCFM) | PRESSURE (PSIA) | DENSITY (#/CU FT) | DIAMETER (FT) | VELOCITY (FT/SEC) | LENGTH (FT) | FRICTION FACTOR | PRESSURE DROP PER PIPE (PSI) | |
|---|---|---|---|---|---|---|---|---|---|---|
| #1A | | | | | | | | | | |
| #1B | 2 | 6,703 | 214.67 | 1.10 | 0.2 | 242.8 | 1,125 | 0.02 | 785.5 | NO GOOD |
| #2A | | | | | | | | | | |
| #2B | 8 | 1,676 | 214.67 | 1.10 | 0.2 | 60.7 | 1,125 | 0.02 | 49.1 | NO GOOD |
| #3A | | | | | | | | | | |
| #3B | 64 | 209 | 214.67 | 1.10 | 0.2 | 7.6 | 1,125 | 0.02 | 0.8 | |

1,000 PSIG (2,225 FT DEEP) HYDROSTATIC PRESSURE
1,000 KWe AIR TURBOEXPANDER/GENERATOR SET

| SCENARIO | NUMBER OF PIPES | FLOW (SCFM) | PRESSURE (PSIA) | DENSITY (#/CU FT) | DIAMETER (FT) | VELOCITY (FT/SEC) | LENGTH (FT) | FRICTION FACTOR | PRESSURE DROP PER PIPE (PSI) | |
|---|---|---|---|---|---|---|---|---|---|---|
| #1A | | | | | | | | | | |
| #1B | 2 | 6,703 | 214.67 | 1.10 | 0.2 | 242.8 | 2,250 | 0.02 | 1,570.9 | NO GOOD |
| #2A | | | | | | | | | | |
| #2B | 8 | 1,676 | 214.67 | 1.10 | 0.2 | 60.7 | 2,250 | 0.02 | 98.2 | NO GOOD |
| #3A | | | | | | | | | | |
| #3B | 64 | 209 | 214.67 | 1.10 | 0.2 | 7.6 | 2,250 | 0.02 | 1.5 | |

1,500 PSIG (3,375 FT DEEP) HYDROSTATIC PRESSURE
1,000 KWe AIR TURBOEXPANDER/GENERATOR SET

| SCENARIO | NUMBER OF PIPES | FLOW (SCFM) | PRESSURE (PSIA) | DENSITY (#/CU FT) | DIAMETER (FT) | VELOCITY (FT/SEC) | LENGTH (FT) | FRICTION FACTOR | PRESSURE DROP PER PIPE (PSI) | |
|---|---|---|---|---|---|---|---|---|---|---|
| #1A | | | | | | | | | | |
| #1B | 2 | 6,703 | 214.67 | 1.10 | 0.2 | 242.8 | 3,375 | 0.02 | 2,356.4 | NO GOOD |
| #2A | | | | | | | | | | |
| #2B | 8 | 1,676 | 214.67 | 1.10 | 0.2 | 60.7 | 3,375 | 0.02 | 147.3 | NO GOOD |
| #3A | | | | | | | | | | |
| #3B | 64 | 209 | 214.67 | 1.10 | 0.2 | 7.6 | 3,375 | 0.02 | 2.3 | |

FIG 14. Pressure Drop in Pipes (Length and Diameter) from Pressure Vessel to Turboexpander Input

METHOD AND APPARATUS FOR USING WIND ENERGY OR SOLAR ENERGY FOR AN UNDERWATER AND/OR FOR AN UNDER SEABED COMPRESSED AIR ENERGY STORAGE SYSTEM

BACKGROUND OF THE INVENTION

Due to the growing demand for energy throughout the world, concerns have grown about the future of the world's energy supplies. Not only are there limited supplies of oil and coal reserves available within the earth's crust, but due to the ongoing security problems and concerns that now exist throughout the world today, there has been a growing desire to reduce our nation's reliance on foreign oil.

Indeed, many energy experts believe that a successful energy solution must include the ability to harness energy from what are often called natural renewable resources, such as the sun and wind. The renewability and abundant availability of these resources make them well suited to the development of potentially viable long term solutions, and many believe that whatever efforts that are currently being made to use these resources must significantly be expanded before the world's oil and coal reserves eventually run out.

One problem associated with the use of renewable energy such as the sun and wind is that the energy is not always available when the energy is needed. Solar power, for example, is only available during the day, and is most effective when the sun is shining brightly, and therefore, the extent to which energy can be provided by the sun is not always predictable. Wind energy is also only available when the wind is blowing, and therefore, it is not a highly reliable source of energy. Another drawback to these resources is that even when energy is available, the amount of energy that they generate is not always consistent. For example, even when the wind blows, it does not always blow at the same speed, or at regular intervals, and therefore, the amount of energy that can be generated is not always consistent. The same is true of solar energy, i.e., the degree to which the sun is shining and available can be sporadic; it often depends on the weather, and therefore, it is never certain how much energy can be generated at any given moment in time.

One potential solution to these problems is to store the energy during times when the energy is available, and using the energy when it is needed most. This is often referred to as time-shifting. Nevertheless, one problem associated with time-shifting relates to the inherent inefficiencies that can result from having to store energy in one form, and then converting the energy into another form before it can be used. This is especially true of compressed air energy storage systems that store compressed air in high pressure storage tanks, wherein the energy must be converted by a generator to produce usable electricity. In such case, the energy used from storage can often end up costing more than the energy that was stored. These inefficiencies can significantly reduce the economic incentives that are needed to promote the installation of these potentially viable systems.

Notwithstanding these problems, because the wind and sun represents a significant natural resource that will never run out, there is a strong desire to develop a system that can not only harness the wind's and sun's energy, i.e., to produce electricity, but to store the energy, and do so in a manner that is efficient and cost-effective, wherein the energy that is generated can then be made available on a continuous and uninterrupted basis, so that it can be used during peak demand periods, as well as when little or no wind is available or little or no sun is available.

Moreover, there are numerous geographical scenarios, especially small island scenarios, wherein the wind blows steadily and strong all through the night when the electric power demand is small but blows weakly and variably all through the day when the electric power demand is peak. Thus there is a need to install a wind turbine farm wherein the excess energy can be collected and stored during the high wind period and then used during the weaker wind period. Energy storage is thereby required.

Moreover, while there has been a steady increase in the number of photovoltaic (PV) cell projects that have been initiated and developed in recent years, each of these projects has had a serious shortfall in electric power production particularly in the late afternoon and early evening when the power demand is high. Thus there is a need to install a PV panel system wherein the excess energy can be collected and stored during the high solar irradiation period and then used during the weaker solar irradiation period.

In island scenarios the availability of onshore real estate is limited. Thus there recently is an effort to place the compressed air pressure vessel offshore and underwater. An example of such an effort is described by Thin Red Line Aerospace. Canadian Thin Red Line Aerospace has completed the first structure specifically designed and built for undersea compressed air energy storage (CAES) in May 2011. The structure, also referred to as "Energy Bag", was anchored to the seabed off the coast of Scotland as part of a major renewable energy research project conceived and led by Professor Seamus Garvey of the University of Nottingham and supported by European renewable energy leader E.ON. The project is the first to investigate large scale offshore storage of wind, tidal and wave power as compressed air.

Wind turbines fill the balloon-like underwater bags with compressed air that later drives electrical generators on demand. While initial application is ideally linked to floating wind turbines, excess electricity from the grid—or from clean energy sources such as tidal and wave power—can also be used to drive compressors to fill the energy bags. The technology is especially suited to countries with relatively deep waters near their coasts.

Energy bags would be anchored at a depth of approximately 600 meters (2000 feet) where the pressure of the ocean takes on the role of high performance pressure vessel. The bag is hereby relegated to a flexible, balloon like structure needing only to restrain the buoyant air bubble contained within—rather than a massive, thick-walled pressure tank of exceptional cost and complexity. At this depth the immense pressure of the ocean ensures high energy storage density, constant pressure regardless of bag volume, and pressure compatibility with existing high efficiency turbine technology. For commercial scale application, Thin Red Line has performed concept development for containment volumes to 6000 cubic meters (212,000 cubic feet).

The prototype energy bag, designed by Thin Red Line's Maxim de Jong, displaces 40 tons of seawater, and is to be anchored to the seabed by its array of Vectran® fiber tendons capable of restraining a total load of 250 tons—yet the entire systems weighs only 75 kilograms (165 pounds). The design is based on Thin Red Line's inflatable space architecture currently being investigated in several NASA programs. Thin Red Line is known for their ultra-high performance fabric structures, having notably developed and manufactured the pressure restraining hulls of the Bigelow Aerospace Genesis 1 and 2 satellites launched in 2006 and 2007, the first spacecraft on orbit successfully incorporating large volume, high-stress inflatable architecture.

The U.S. Navy (FIG. 1) is considering a similar configuration wherein the depth of water is 450 feet or 200 psig hydrostatic pressure. The advantage here is that the compressor need only operate at an efficient 200 psig rather than operating at higher pressures. Furthermore, the turboexpander/generator operation at 100 psig input pressure only requires 1-stage operation and 200 psig input pressure requires only 2-stage operation. Besides, the flexible bag material does not require special design. In this operation the flexible bag operates between completely filled to completely empty.

FIG. 4 shows the characteristics of the underground cavern CAES systems now in existence. These systems are huge and require a specific geographic location for use by a specific community, require that the walls of the cavity be located in geology with very low permeability, require multi-year planning and construction and huge investment of capital. Furthermore the underground cavern CAES requires the combustion of fuel.

The T-CAES and TL-CAES systems patented by Enis/Lieberman do not require any of the underground CAES features. It is a green system with no combustion of fuel.

The principal of the T-CAES and TL-CAES systems is herein extended to off shore locations and either under water and above the floor of the sea or lake bed or under soil beneath the floor of the sea or lake bed. This configuration is of specific interest to small island scenarios where on shore property is scarce and expensive.

SUMMARY OF THE INVENTION

The invention relates to a method and apparatus for using wind turbine and/or solar energy to enhance the efficiency of an underwater compressed air energy storage system (and visa-versa) and to enhance the efficiency of underwater in-soil compressed air energy storage system (and visa-versa).

The apparatus comprises a wind turbine and/or photovoltaic panel to drive a compressor, which provides compressed air energy into an underwater pressure vessel. The buoyant rigid-wall pressure vessel may be located and restrained under water or it may be located in the we soil underwater. The pressure vessel may be horizontal or in vertical configurations as well as parallel or perpendicular orientation to the shoreline.

The pressure vessel may be constructed of high compression strength reinforced concrete or reinforced fiber plastic material that need not have a high thermal capacitance or high thermal conductivity. Thus the compressed air, as it exhausts from the pressurized tank, will continuously loss temperature as it drops in pressure. This exhaust of colder and colder air will feed this air from the pressure vessel near the floor of the sweet water or salt water depth to the turboexpander input on the surface via long vertical small diameter pipes through the 50 to 70 deg F water.

The key innovation is that the pressure vessel no longer needs to both contain/supply the air pressure and to supply heat from its thick steel walls to cooler and cooler expanding gases. The heat transfer now occurs in the output metal pipeline extending from outside the pressure vessel. Furthermore, the multiple small diameter pipes are in contact with high pressure water rather than being in air as is the case for the above ground compressed air vessels.

The overall system efficiency is further enhanced by the chilled air by-product of the turbo expander which is used directly by a HVAC system (completely green) because there is no combustion of fuel involved. The super-chilled air from this green system can be combined with the local saltwater to generate potable water and for large scale systems the mineral content of the saltwater can be recovered.

In a partially green overall system the super chilled air from the turboexpander/generator set is fed as input air to generate the electrical power from an associated fuel-driven generator set that yields about 30% more electrical power on hot summer days. The waste heat from the air compressor and from the turboexpander/generator set exhaust is simply used as a hot water supply or in large scale systems is used in a Combined Heat and Power system (CHP) to power either a steam-driven generator set or an absorption chiller

BRIEF DESCRIPTION OF THE DRAWINGS

FIG. 1 is a schematic view of the under seabed compressed air energy storage system, according to an embodiment of the prior art;

FIG. 2 is a schematic view of the under seabed compressed air energy storage system, according to an embodiment of the present invention;

FIG. 3 is a schematic view of the under seabed compressed air energy storage system, according to an embodiment of the present invention;

FIG. 4 is a table of prior art data on existing compressed air energy storage systems, according to an embodiment of the present invention;

FIG. 5 is a table of air compressor data for the under seabed compressed air energy storage system, according to an embodiment of the present invention;

FIG. 6 is a graph of air compressor efficiency for the under seabed compressed air energy storage system, according to an embodiment of the present invention;

FIG. 7 is a table of pressure within the pipeline of the under seabed compressed air energy storage system, according to an embodiment of the present invention;

FIG. 8 is a table of turboexpander efficiency of the under seabed compressed air energy storage system, according to an embodiment of the present invention;

FIG. 9 is a graph of turboexpander efficiency of the under seabed compressed air energy storage system, according to an embodiment of the present invention;

FIG. 10 shows performance calculations of the under seabed compressed air energy storage system, according to an embodiment of the present invention;

FIG. 11 is a table showing weight of the under seabed compressed air energy storage system, according to an embodiment of the present invention;

FIG. 12 is a graph of Kaoline Clay strength of the under seabed compressed air energy storage system, according to an embodiment of the present invention;

FIG. 13 is a table of vertical cylinder requirements of the under seabed compressed air energy storage system, according to an embodiment of the present invention; and FIG. 14 is a table of pressure within the pipeline of the under seabed compressed air energy storage system, according to an embodiment of the present invention.

DETAILED DESCRIPTION OF PREFERRED EMBODIMENTS

The present invention represents an improvement over past attempts to harness energy from renewable resources such as the wind and the sun insofar as the present system preferably incorporates not only the advantages of using wind or solar energy, but the advantages of using compressed air energy storage systems, wherein some of the previous inefficiencies of using compressed air are overcome.

FIG. 2 and FIG. 3 show the off shore compressed air energy storage system using wind turbine(s) and/or solar photovoltaic panel(s) that are described herein in detail. The off shore compressed air energy storage system consists of the following major elements:

Air compressor
Underwater accumulator
Turboexpander/generator set

The output of the typical OCEAS system will consist of the following:

Electricity
High mass flow of super-chilled air
Hot water

There are connecting elements between the systems, electric and pneumatic actuated valves, sensors, control system, recorders and instrumentation that continuously and automatically support the above principal elements.

Consider a single or multiple set of wind turbine generators or a set of solar photovoltaic panels that supply all the immediate power. Further consider that this installation is made over-sized so that all the excess power from the wind or the sun powers the air compressor. It is this excess green energy that drives the air compressor.

The installation technology for a rigid reservoir has been developed and demonstrated worldwide in support of the offshore oil and gas industry. This includes the utilization of large floating cranes and remotely controlled work systems with application from initial site surveys to suction pump control and piping hookups. With minimal moving parts and materials known to have a long life in sea water, the rigid reservoir can offer high reliability for service-free life over 50 years and beyond.

FIG. 4 shows the huge size of conventional underground compressed air energy storage systems. Herein we are discussing smaller power delivery and smaller energy delivery systems associated with islands that have limited on shore space. The available space is offshore.

The major components of the system will now briefly be described. The order of the elements is described in accordance with the design principles that need to be satisfied in order to specify the next element. The order of discussion is therefore:

Air Compressor (FIGS. 5 and 6)

The 24-hour electric power demand history, taken from season to season, determines the size of a wind turbine farm or size of a solar voltaic panel array. There must be sufficient power from the farm/array to deliver both the instantaneous power required at each moment and also must have sufficient excess power from the farm/array to deliver the instantaneous power required at those times the green energy is not available.

Thus the wind histories must be used to see just when the wind is blowing to supply its power during the typical 25 to 30% of time of the year it is blowing, or how many of the days the sun is shining during the year. The available green energy, product of power and time duration, must be sufficient so that with the expected round trip energy efficiency that there will be sufficient green energy to earlier supply the power at the times that the power is needed at a later time.

In this case we will assume that we are considering a wind turbine farm or solar panel array that needs to supply 2,000 kW to the compressor to drive the compressed air energy storage system. The 2,000 kW is just the portion of the captured green energy devoted to the energy storage system wherein the green energy source is much larger to meet the immediate required power demand.

FIG. 5 shows an eight-stage, high pressure, air compressor design. Consider only seven stages of compression so that air at 14.67 psia air compressed to 1,252.95 psia. The efficiency of each stage is shown to start at 75% and decay to 63%. Had we wanted to compress to an even higher pressure, stage 8 shows a drop in efficiency to 55%.

The coolant water circulating through the body of the compressor assures that the 218 to 224 deg F. compressed air is returned to 75 deg F. before feeding air to the next stage.

Some of the moisture in the intake air is forced to into saturation at the higher pressure so that hot water is discharged between the stages of compression.

FIG. 5 shows the seven-stage compressor requires 3,077 hp (2,295 kW). It also shows 25% of 2,295 KWe is converted to waste heat. This represents up to 574 kW available for later use if it is used elsewhere in the system.

The waste heat energy is significant for two reasons. We finally intend to produce 1,000 kW of useful electrical power so that the 574 kW is a vital statistic.

Furthermore the compressor will be operating for about 7.8 hours whereas the turboexpander/generator unit will be operating for 2.3 hours. Thus the energy content of the compressor is sufficiently large to justify effort to recover portion of the compressor waste heat.

The calculation of the pressure vessel volume depends upon the compressor power efficiency and the turboexpander/generator power efficiency by means of the performance parameter, SCFM/HP. Thus 1 HP compressor power is able to supply 3 SCFM of air flow at a stated pressure and pressure difference. But the 1 HP of electricity produced requires airflow of 10 SCFM at a stated pressure and pressure difference.

FIG. 6 shows the relationship of SCFM/HP for a multistage compressor as a function of the initial pressure at 14.67 psia and the displayed final compressed air pressure. Note that systems that compress air to 200 psia are desirable from the viewpoint of thermodynamic efficiency. Systems that compress air to 1,200 psia are less efficient from the thermodynamic viewpoint but very efficient when considering the real estate footprint by a much small pressure vessel.

Pipe System from Compressor to Pressure Vessel (FIG. 7)

The inside diameter of the pipe is required to flow the compressed air from the compressor to the pressure vessel. The pipe wall may be made of non-thermally conductive material in that it is an advantage to deliver the hot compressed air from the last stage of the air compression directly to the pressure vessel with little heat transfer to the surrounding water.

Consider the 2,000 kWe (2,681 HP) air compressor operation when it attains 1,200 psig pressure output. At 2 SCFM/HP the airflow from the compressor is 5,362 SCFM. Consider a single long pipe of 1,125 feet and 0.2 feet inside diameter. The 1,200 psig at the compressor output will arrive at the pressure vessel with 89 psig pressure drop. This scenario considers that the downward distance between compressor and the closest import port to the pressure vessel is 1,125 feet. If there is another 1,125 feet horizontally to reach the compressor on shore, the total pressure drop would be about 190 psig. This scenario is unacceptable.

The alternate scenario to achieve acceptable performance is to consider the compressor high pressure airflow through four pipes. This factor of four reduction in mass flow within the same pipe diameter causes a fourfold decrease in air velocity from 343 ft/sec to 8.6 ft/sec. Because of the strong sensitivity of frictional pressure drop on air velocity in the same pipe, the 89 psig pressure drop decreases to 5.6 psig or a 16-fold enhanced performance. This scenario still considers that the downward distance between compressor and the closest import port to the pressure vessel is 1,125 feet so the pressure drop is 5.6 psig. If there is another 1,125 feet horizontally to reach the compressor on shore, the total pressure drop would be about 11.2 psig. This scenario is acceptable.

The remainder of the FIG. 7 table considers not only the final delivery pressure of 1,200 psig, but also the initial pressure of the pressure vessel. Note that the pressure vessel cycle is 0-, 1,200-, 200-, 1,200-, 200-, 1,200- . . . psig.

Consider the 2,000 kWe (2,681 HP) air compressor operation when it attains 200 psig pressure output. At 3.75 SCFM/HP the airflow from the compressor is 10,054 SCFM. Consider a single long pipe of 1,125 feet and 0.2 feet inside diameter. The 200 psig at the compressor output will arrive at the pressure vessel with a 1,767 psig pressure drop. But we started at 1,200 psig so that this case is impossible to achieve. This is unacceptable.

Switching from 1 pipe to 4 pipes in parallel does not help the magnitude of the pressure drop in the uppermost table of FIG. 7. It is necessary to consider 16 pipes. As we progress down to the lower depths and longer pipes the necessity of the 16 pipe bundle appears to apply to all the scenarios described in FIG. 7.

Turboexpander/Generator or Compander (FIGS. 8 and 9)

Electrical Power and Thermal Power Output—Green System

The compressed air from the pressure vessel is metered to the turboexpander/generator or to the compander by a mass control valve. At near atmospheric air temperature (no combustion), the 100 psig air input to the turboexpander permits the use of a 1-stage air expansion; the 200 psig air input to the turboexpander requires the use of two-stages air expansion. For the 200 psig expansion, the turboexpander/generator set generates about 1 MW of electrical power and 1 MW of thermal power.

The 100 psig input air to a turboexpander permits the use of a one-stage turboexpander. Although, this input air pressure results in low efficiency. One needs to draw more than 12 SCFM from the accumulator to generate 1 HP (0.745 kWe) of electricity. On the other hand, there are a multitude of vendors at this pressure input level. This is especially the case when we are using moist input air.

The 200 psig input air to a turboexpander requires a two-stage turbine. The extremely cold exhaust air from the first stage contains fine ice particles. The population of ice particles is expected to be small because of the very short time interval during the passage of the air through the turbine wheels. This is a consideration that leads some vendors to consider a particle removing device between stages. Almost all the turboexpander vendors concern themselves with this issue and provide test facilities to assure long term performance. There are two vendors whose fundamental turbine wheel design is insensitive to particle formation in the two stages. One needs to draw more than 10 SCFM from the accumulator to generate 1 HP (0.745 kWe) of electricity.

There are two-stage turboexpanders that accept 600 psig air input. These systems are of interest when the required final exhaust pressure is of the order of 40 psig to assure the flow of air through long downstream ducting. One needs to draw more than 8 SCFM from the accumulator to generate 1 HP (0.745 kWe) of electricity.

The above system can be used wherein there is no injected fuel is used with compressed air from the pressure vessel. The system is entirely green. The energy of the wind and/or sun is used to generate both electricity and a high mass flow of super-chilled air. Increased round trip energy efficiency is obtained by using the coolant water exhaust (waste heat) from the compressor and/or from the turboexpander/generator set in a combined heat and power system (CHP) system to power either a steam-driven generator set or an absorption chiller.

Only Thermal (Chill) Power Output—Green System

For a compander, no electricity is generated. Only a high mass flow of super chilled air is generated. This refrigeration system replaces the ammonia-type refrigeration system with their potential for accidental toxic plume releases. This version of the green system generates only a high mass flow of super-chilled air and with no electricity. The turboexpander/generator is replaced by a "compander" such as those offered by Air Products and more recently by Cryostar.

Only Electrical Power Output—Fuel Combustion

When there is combustion introduced the traditional compressed air energy storage system, the fuel is sprayed into 600-psig compressed air drawn from the pressure vessel. The resultant hot combustion products exhaust is fed through a recuperator so that the cold air from the pressure vessel is heated prior to the fuel addition and subsequent combustion. This scenario applies to clients who require only electrical power output and not interested in chilled air output.

Increased Electrical Power Output and Some Thermal (Chill) Power Output—Some Fuel Combustion On the other hand, consider another version wherein there is some fuel consumption, but at a reduced rate. The above green system is used to generate both electrical power and a high mass flow of super-chilled air. Consider a nearby associated fuel-driven generator set on a hot day wherein it functions at low efficiency. Its system efficiency will be enhanced by making use of the chilled air by-product exhausted from the turboexpander to generate more electrical power from the associated fuel-driven generator set.

The following idealized calculation shows the extent of the water wrung out of the air to deliver dry air to the turboexpander.

Consider 21 4-feet diameter and 89-feet long pipes in FIG. 2. These pipes contain 1,945,790 SCF of air. The density of 1 SCF of air is 0.075#/CU FT. Thus there is 145,934#air in the pipes that was drawn from the on-shore air. The on-shore air contains 0.01#water/#air @ 1 atm. and 75 deg F. At 50% humidity there is 0.005#water/#air @1 atm. and 75 deg F. Thus there is 729.67#water or 87.6 gallons of water ingested into the pressurized tank when it is filled with air.

On the other hand the pressured air in the tank is at 83.3 atm. and 50 deg F. is 100% saturated so that it can only contain 0.00015#water/#air. Thus the pressurized air can only support 291.87#water or 35.04 gallons. Thus there is 52.56 gallons of water that requires draining from the storage tank. (Actually, less needs to be drained because the compressor already removes some of the water from the air.)

Pressurized Air Accumulator (FIGS. 10, 11, 12 and 13)

The size of the pressurized air accumulator is derived by considering the performance of air compressor as shown in the SCFM/HP plot (FIG. 6), the turboexpander/generator system in SCFM/HP plot (FIG. 9), the available power input (given design parameter), the available time of the power input (given design parameter), the required power discharge (given design parameter) and the derived discharge time of this power (FIG. 10). In FIG. 10 the single pipeline pressure vessel will be 4 feet inside diameter and 1,870 feet long. If the pressure vessel is built in 81 ft lengths there will be 23 cylinders.

FIG. 11 considers the cylinders anchored above the sea floor so that it is necessary to consider ballast to balance the buoyancy force acting on the pressure vessel.

FIG. 12 considers the cylinders anchored below the sea floor so that it is not necessary to consider ballast to balance the buoyancy force acting on the pressure vessel. There is a shear force that keeps the horizontal pressure vessel or vertical pressure vessel from being buoyed to the surface. The shear force available to act on the horizontal or vertical cylinder varies with depth, wherein the available shear force increases linearly with depth (FIGS. 12 and 13). At depths of interest (FIG. 13), the shear force exceeds the buoyancy force (FIG. 11).

In the following discussion we will consider the offshore compressed air energy storage system with either of two rigid wall underwater pressure vessels.

Horizontal Circular Cylindrical Rigid Wall Accumulator pressurized to 600 to 2,400 psig:
  Parallel to Shore Line
  Perpendicular to Shore Line
  Vertical Circular Cylindrical Rigid Wall Accumulator pressurized to 600 to 2,400 psig:
  Parallel to Shore Line
  Perpendicular to Shore Line Either configuration can be suspended in the water above the water bottom or in the soil/sand/clay beneath the deep water bottom.

The Circular Cylindrical Rigid Wall Accumulator pressurized to 1,200 psig can serve both shallow and deep water depths. Both horizontal and vertical cylinders will be useful in saving on shore real estate by being located off shore. Also the rigid wall cylinder sunk into the sea floor itself will have the advantages:

Minimize the need and expense for anchoring against buoyancy forces
Minimize the need and expense of thick walls
Reduces need for on shore and off shore real estate
Minimizes interaction with sea water, marine life and marine organisms
Cylinder wall materials need not be steel that is subject to corrosion Past compressed air energy storage systems, sited in huge underground caverns used fuel to combine with the released compressed air to drive the turboexpander to generate electricity. The power output was of the order of 290 MW and for <3 hours up to 110 MW for 26 hours. The ~1,000° F. hot exhaust from the combustor was forced into a recuperator heat exchanger so that the compressed air input to the turboexpander was heated just prior to the combustor where fuel was injected to gain further heating by combustion. In the particular application where there is only need for electricity and there is no need for chilled air, this system applies.

In the above ground steel pressurized vessel compressed air energy storage systems patented by the authors (Dr. Ben Enis and Dr. Paul Lieberman) no fuel is combusted. These systems are sized for 1 to 10 MW electrical power discharge for 4 to 8 hours. Furthermore, the absences of combustion results in high mass flow of extremely cold air exhausted from the turboexpander. This high mass flow of super-chilled air is then used as (1) HVAC air conditioning (2) Desalination (3) Recovery of minerals from saltwater freeze crystallization and/or (4) Carbon dioxide extraction and capture from fuel fired power plant flue gases as discussed in our listed patent disclosures.

The earlier onshore Enis/Lieberman T-CAES systems and onshore TL-CAES systems used thick steel walled cylindrical pressure vessels to both contain the high pressure compressed air to assure that the air exhausted from the pressure vessel was at near constant air temperature to assure optimum performance of the turboexpander/generator. As the air exhausts from the rigid walled pressure vessel, the progressively reduced amount of air in the tank causes a lower and lower pressure in the vessel and simultaneously causes a lower air temperature. The temperature in the thick walled steel pressure vessel wall is developed and sustained by the direct input hot air from the compressor and the heat transfer from warm outside air. But when the internal air temperature tends to drop during the air exhaust cycle, the available heat from the thick pressure vessel steel walls is transferred to the remaining pressurized (dense) air. The tests at the Santa Clarita (CA) Field Laboratory at National Technical Systems conducted by the authors (Enis/Lieberman) and sponsored by the California Energy Commission determined the relationship of the pipe diameter, pipe wall thickness and exhaust rate of the compressed air to assure a small drop in air temperature over the time period that the turboexpander operates.

In this patent disclosure the expense of the thick walls that are required in onshore applications are avoided by taking advantage of the hydrostatic pressure available at specific depths in the sea water or other body of water. At great depths the outer compressive pressures will apply their favorable influence on pressure vessel internal pressure containment. In the case of concrete, where the compressive strength far exceeds its tensile strength, relatively inexpensive material cost and fabrication cost offers an opportunity to save funds on the most expensive element of the compressed air energy storage system.

At great depth where the hydrostatic pressure exceeds 1,200 psig, the internal pressure within the pressure vessel will not exceed 1,200 psig because the air compressor efficiency falls severely at higher pressures. Thus at great depth the radially inward water pressure outside the pressure vessel is greater than the radially outward air pressure inside the pressure vessel. This difference introduces a compressive stress on the pressure vessel walls. Note that reinforced concrete is much stronger in compression than in tension. Thus reinforced concrete can apply here. Thus at a hydrostatic water depth of 2,400 psig and an internal compressed air pressure of 1,200 psig permits use of the high efficiency of a 1,200 psig compressor but still allow the pressure vessel to either rest in water on the soil bed surface or be buried within the soil bed. The high pressure compressed air permits the stored air to be confined in a minimum space.

At shallow depths, the inner air pressure can exceed the outer hydrostatic pressure, so that the pressure vessel walls will be in tension. At shallow depth where the hydrostatic pressure exceeds 200 psig and the internal pressure within the pressure vessel will be of the order of 1,200 psig, Reinforced Fiber Plastic (RFP) vessels show their advantage because RFP vessels are particularly strong in tension.

Consider the Reinforced High Compression Strength Concrete cylinder 48 inches inside diameter, 1,200 psi compressive pressure difference, 5,000 psi compressive strength and with a safety factor of 1.5. The wall thickness is 8.64 inches.

Consider the Polyester and Continuous Rovings Laminate 70% E-glass cylinder, 48 inches inside diameter, 1,200 psi compressive pressure difference, 50,800 psi compressive strength and with a safety factor of 1.5. The wall thickness is 0.85 inches. Note the factor of 10 difference in wall thickness between reinforced concrete and reinforced fiberglass.

At 1,200 psig because the air compressor efficiency falls but there is the advantage of a more compact accumulator volume and the availability of commercial compressors at 1,200 psig pressure.

Recall that the thick walled steel pressure vessel has an extra thick wall because storage vessel codes require a Safety Factor of 4.0 in onshore applications wherein personnel can be in the area. In off shore underwater applications the water depth reduces the pressure difference across the pressure vessel walls over a large range of scenarios. There is also no need for the Safety Factor of 4.0 in underwater scenarios because the thickness of the pressure vessel is thinner when there are no nearby personnel on foot (underwater) that would be subject to potential high speed fragments or airblast when there is the accidental rupture of the pressure vessel in on shore scenarios.

In both deep water and shallow cases, the use of inexpensive poorly thermally conductive materials are acceptable because the exhaust piping from the deep water pressure vessels to the surface will be made of multiple small diameter steel pipes whereby the cold air at the bottom of the pipe near the pressure vessel will be warmed during its transit to the water surface and onto the onshore turboexpander.

If the temperature drop in the pressure vessel is too extreme for the containment vessel consideration will be given to adding thin walled vessels filled with water to assure less temperature swings inside the pressure vessel.

The underwater cylindrical pipe made of reinforced fiber or reinforced concrete provides the advantage of enhanced longevity when exposed to pressure cycling and seawater. At the 1,200 psig pressure we consider 4 feet diameter and 2,940 feet to 3,250 feet length of pipe. These could be multiple sections prepared in pre-assembled modules with 2 to 3 pipes mounted above one another for the horizontal cylinders or in array of adjacent vertical cylinders—this will reduce anchoring costs. For shipping purposes, pipe lengths 80 to 90 feet long can be used. For the lower internal pressures there is a new technology being offered by a laboratory associated with a US university that permits inexpensive continuous mile-long RFP pipe manufacturing at the work site.

The 1,200 psig underwater pipe supplies an important advantage when considering on-shore air compressors sited in a warm humid atmosphere close to the seashore. The air is humid. True, the compressor will expel hot water during each of its 5 or 6 stages of compression. However, it will be the storage tank at great depth that will contain a drain system to assure that very dry air is delivered to the turboexpander so that ice formation issues are ameliorated.

Consider the following special characteristics of each of the eight cylindrical air pressure vessels:

1. Parallel to the Shoreline, Horizontal and in the Water Above the Bottom. This pressure vessel orientation permits all the usual traffic and near shoreline use of the body of the water without interference from the presence of the pressure vessel.

2. Perpendicular to the Shoreline, Horizontal and in the Water Above the Bottom. This pressure vessel orientation permits the hot compressed air from the final stage of the air compression to flow to the pressure vessel over a short distance so that there is a minimum of temperature drop and minimum of pressure drop. It also permits the air flow from the colder and colder air exhausting from the distal end of the pressure vessel to flow through a long path so that the local warm water temperature will importantly heat the air fed to the turboexpander input to produce a higher electrical power output.

3. Parallel to the Shoreline, Vertical and in the Water Above the Bottom. This pressure vessel orientation permits use of the minimum horizontal area in the water. If 90 feet long cylinders comprise the array of pressure vessels, it is preferable to consider depths that are sufficiently deep to permit safe passage of ships.

4. Perpendicular to the Shoreline, Vertical and in the Water Above the Bottom. This pressure vessel orientation permits the pressure vessel array to be extended from a manifold wherein the compressor feeds its hot output air to the nearest end of the manifold to pressurize the cylinders, whereas the distal end of the manifold permits favorable heat exchange between the cooler and cooler exhaust air from the discharging pressure vessel to be warmed by the long distance path of the colder and colder exhaust air through the much warmer ambient water. If 90 feet long cylinders comprise the array of pressure vessels, it is preferable to consider depths that are sufficiently deep to permit safe passage of ships.

5. Parallel to the Shoreline, Horizontal and in the Soil/Sand/Clay Below the Bottom. This pressure vessel orientation permits safe passage of ships and does not interfere with the local marine life. If buried at sufficient depth where the bottom soil shear strength is sufficient, the need for ballast to assure that the pressure vessel remains anchored against its inherent buoyancy force.

6. Perpendicular to the Shoreline, Horizontal and in the Soil/Sand/Clay Below the Bottom. This pressure vessel orientation permits safe passage of ships and does not interfere with the local marine life. If buried at sufficient depth where the bottom soil shear strength is sufficient, the need for ballast to assure that the pressure vessel remains anchored against its inherent buoyancy force.

This pressure vessel orientation permits the pressure vessel array to be extended from a manifold wherein the compressor feeds its hot output air to the nearest end of the manifold to pressurize the cylinders, whereas the distal end of the manifold permits favorable heat exchange between the cooler and cooler exhaust air from the discharging pressure vessel to be warmed by the long distance path of the colder and colder exhaust air through the much warmer ambient water.

7. Parallel to the Shoreline, Vertical and in the Soil/Sand/Clay Below the Bottom. This pressure vessel orientation permits safe passage of ships and does not interfere with the local marine life. If buried at sufficient depth where the bottom soil shear strength is sufficient, the need for ballast to assure that the pressure vessel remains anchored against its inherent buoyancy force.

8. Perpendicular to the Shoreline, Vertical and in the Soil/Sand/Clay Below the Bottom. This pressure vessel orientation permits safe passage of ships and does not interfere with the local marine life. If buried at sufficient depth where the bottom soil shear strength is sufficient, the need for ballast to assure that the pressure vessel remains anchored against its inherent buoyancy force.

This pressure vessel orientation permits the pressure vessel array to be extended from a manifold wherein the compressor feeds its hot output air to the nearest end of the manifold to pressurize the cylinders, whereas the distal end of the manifold permits favorable heat exchange between the cooler and cooler exhaust air from the discharging pressure vessel to be warmed by the long distance path of the colder and colder exhaust air through the much warmer ambient water. This configuration occupies the least surface area.

In all cases the underwater compressed air energy storage system permits not only a configuration that minimizes the use of on-shore real estate, but there is also a cost savings in the manufacture and installation of the pressure vessel.

Whereas the conventional on-shore Enis/Lieberman T-CAES TL-CAES systems used thick walled steel pressure vessels to assure that the thick steel walls not only contained the high air pressure but also permitted the storage of heat during compression and the release of heat to the expanding exhaust air. This forced the use of expensive steel. Furthermore, the onshore safety codes required a Safety Factor of 4.0 to assure a wall thickness that maintained a safe working environment for nearby personnel.

On the other hand, the pressure vessel in water or in soil permits the use of reinforced fiber plastic pressure vessel walls or reinforced concrete pressure vessel walls because the restriction that the walls need to have a heat capacity, high density and high thermal conductivity (high thermal diffusivity) becomes relaxed because the heat transfer requirement is now removed from the pressure vessel and placed on the multiple parallel and small diameter steel pipes that connect the pressure vessel to the turboexpander.

In addition to the shift of the heat transfer properties from the pressure vessel to its downstream pipes, the Safety Factor of 4.0 need no longer apply. There are no nearby working personnel either below the water surface or below the ocean floor. Furthermore, there is no need to be concerned about bursting pressure tanks on shore where high speed small fragments and low speed large fragments propagate long distances in air, a burst pressure tank under water prevents any high speed or low speed fragments from propagating any dangerous distances.

The air temperature histories in the underground caverns during the cavern exhaust operation showed that temperature drops can be excessive when considering that no fuel will be burned to heat the air. Thus there needs to be a modification to the cylindrical pipe walls such as those made of reinforced fiber plastic or reinforced high compression strength concrete. The reinforcement in the conventional pipes is there to add tensile strength to the cylindrical pressure vessel. It is also recommended that radial metal elements be added, not for mechanical strength, but to enhance inward radial transfer of heat from the surrounding water or surrounding saturated soil. Furthermore it is recommended that these radial elements be terminated on the inside surface of the pressure vessel with a metallic pipe to assure heat transfer path in complete contact with the contained high pressure air.

What remains now is the discussion of the conventional methods for placing these pressure vessels afloat under the water surface but above the water bottom and for placing these pressure vessels in the soil hole or soil trench below the water-bottom. The relevant technology is available for the placement of horizontal pipes on/in the sea water bottom or vertical piles in the sea water bottom.

Horizontal Pipes

Offshore pipelines are typically laid on the seabed and lowered into the seabed (trenched) over large sections to provide protection from shipping and fishing activities, or to stabilize the pipeline from hydrodynamic loads. Accurate estimates of the resistance to upward pipeline movement of the overlying trench-backfill are important for design and analytical purposes. The undrained shear strength of the upper layers of the seabed (particularly the initial 2 to 3 m below the mud-line) is a vital part of pipeline site investigations and is commonly found using the standard in situ cone penetrometer (CPT) and T-bar tests operated from an Remotely Operated Vehicle (ROV) for the determination of undrained shear strength parameters for buried pipeline.

The cone penetrometer test (CPT) provides a continuous measurement of soil shear strength and, in addition, allows the stratigraphy of the profile to be identified. The CPT data is corrected overburden pressure and pore pressure. is also required.

Floating structures for drilling for, and producing, petroleum are anchored on the seabed by means of drag plates or anchors, gravity structures, plates or piles which may be forced in, or by means of piles which are drilled and cemented in.

Piles which are forced in may be installed by means of pile drivers, blasting, or a suction system (applicable to short piles with a large cross section). During pile-installation operations, these forcing-in systems require special equipment, such as large support vessels or equipment which operates on the seabed, using hydraulic units controlled from service vessels.

When it is necessary to operate in places where the water is very deep, such operations become more difficult, lengthy and costly.

About ten years ago, torpedoes have been used as piles to anchor oil and gas facilities offshore Brazil. These 30-in.-OD, finless torpedo piles have also been used to anchor ships and mono-buoys. Of interest herein are the torpedo piles with outside diameters (OD) of 30 and 42 inches. The 30-in.-OD torpedo piles used to anchor risers were fitted with fins and weighted up to 400 kN (94,420 pounds); while the 42-in.-OD piles had an air weight of 620 kN (139,382 pounds). Pull-out capacities after ten days of set-up time were 3 to 4 times the air weight of the torpedo pile.

The deep penetrating anchor (DPA), for anchoring offshore is 1.2 m in diameter, 13 m in length, weighs 740 kN and has a blunt massive tip and four thick fins attached to its upper part. The shank is filled with concrete containing a percentage of steel. Thus there is the technology to install the 4.0 feet inside diameters in water and even in the soil below the water bottom.

Pipe System from Pressure Vessel to Turboexpander (FIG. 14)

The pipe sizes leading from the pressure vessel to the turboexpander generator set described in FIG. 14. Whereas the pipe airflow from the compressor at 200 psig is smaller than the airflow feeding the turboexpander at 200 psig, the number of pipes from the compressor may be as high as 16, the number of pipes from the pressure vessel may be between 32 and 64.

It is necessary to fabricate these pipes from stainless steel to assure both strength and effective heat transfer from the surrounding seawater into the high speed airflow within the pipe.

FIG. 1 generally describes the existing underwater flexible bag pressure vessel Ocean Compressed Air Energy Storage (OCAES) System Technology. The low pressure version places flexible bag at 450 feet ocean depth or 200 psig hydrostatic-pressure. When a green power source (wind and/or solar) is available the compressor fills the flexible bag. When the power is needed, the flexible bag continuously exhausts its 200 psig air to the input of the turboexpander that drives an electricity generator set.

FIG. 2 describes horizontal (also vertical) the rigid Wall Underwater (but above the sea floor) UW-CAES System wherein the pressure vessel is oriented parallel to the shoreline or perpendicular to the shore line. The green power source (wind and/or solar power powers a high pressure air compressor that fills the pressure vessel from 200-psig to 1,200 psig during its filling cycle. The pressure vessel exhausts itself from 1,200 psig to 200 psig to flow ~200 psig compressed air via metallic walled pipelines to the input of the turboexpander. The turboexpander generates a high mass flow of super-chilled air and the attached generator generates electricity. The output of the system is electricity, chilled air and hot water.

FIG. 3 describes the vertical (also horizontal) rigid Wall Underwater (but below) the sea floor) UW-CAES System wherein the pressure vessel is oriented parallel to the shoreline or perpendicular to the shore line. The green power source (wind and/or solar power powers a high pressure air compressor that fills the pressure vessel from 200-psig to 1,200 psig during its filling cycle. The pressure vessel exhausts itself from 1,200 psig to 200 psig to flow ~200 psig compressed air via metallic walled pipelines to the input of the turboexpander. The turboexpander generates a high mass flow of super-chilled air and the attached generator generates electricity. The output of the system is electricity, chilled air and hot water. The shear forces available to restrict the vertical buoyant force on the pressure vessel are available from within the soil deep under the ocean bottom.

FIG. 4 is a table that describes the existing onshore underground cavern compressed air energy storage systems. These systems burn fuel so that more electricity is generated by these systems than by the systems shown in FIGS. 2 and 3 wherein no fuel is combusted.

FIG. 5 describes the air pressures and air temperatures from input to output of each stage. The same air mass flows from stage to stage. The input air to the next stage of compression is cooled to near room temperature by the coolant water circulating in the body of the compressor. At each high pressure point and cool temperature of a stage of compression, the interstage input moisture is compressed and drained.

FIG. 6 is a graph that shows the decreasing efficiency of compressing air at the higher and higher final air pressures. The efficiency is expressed as standard cubic feet per minute (SCFM) air flow per 1 horsepower (HP) of required power, SCFM/HP. This format permits convenient calculation of the system required sizes for a specified system performance.

FIG. 7 is a table that uses the calculation for the pressure drop in pipes that connect a specific onshore compressor air flow at a long distance from the offshore pressure vessel that requires horizontal length and vertical length. A pipe diameter between 2 and 3 inches was selected in accordance with the performance characteristics of a 2,000 kWe multistage compressor.

FIG. 8 describes the detailed thermodynamic analysis of a turboexpander/generator at 85% and 90% efficiencies based upon the equation of state of air. The input pressure, input temperature, output pressure and energy efficiency determine the output temperature and the SCFM of air flow required to generate 1 HP (0.746 kWe) of electricity. Furthermore, the final air temperature and air mass flow determine the thermal chill power that is generated. The final result is that 1 MW thermal power is generated as each 1 MW of electrical power is generated.

FIG. 9 is a graph that shows the decreasing electrical power generation efficiency of the turboexpander as the input air temperature is decreased and as the air pressure is reduced. If more electrical power is required and less thermal power is accepted, then waste heat can be used to warm the input air to the turboexpander. This maintains the green energy description of the system since no fuel is combusted. On the other hand if no chilling power is required and only electricity is required, then the combustion of fuel is recommended as well as the attachment of a recuperator to capture the energy available from the hot combustion chamber. The efficiency is expressed as standard cubic feet per minute (SCFM) air flow per 1 horsepower (HP) of required power, SCFM/HP. This format permits convenient calculation of the system required sizes for a specified system performance.

FIG. 10 shows a sample calculation of pressure vessel size that accepts 2,000 kWe Air Compressor Operation for ~7.8 Hours delivery of 1,812,820 SCF to the pressure vessel and includes the air mass flow withdrawn at 200 psig to generate 1,000 kW (electricity) and 1,000 kW (thermal) power for 2.3 hours.

FIG. 11 shows a table that calculates the weight per foot of underwater reinforced concrete cylinders above seabed floor versus upward buoyancy force of displaced seawater. Each scenario results in a specific required wall thickness wherein some wall thicknesses are so great that ballast is not required.

FIG. 12 shows the shear strength data for Kaoline clay or China Clay for application to pile vertical pull out force calculation. The shear force increases linearly with the depth of the soil. There are similar charts for other sands, soils and clays below the ocean floor. These data are used to calculate the pile pull out force that support offshore drilling platforms and support the pile pull out force to anchor under the sea bottom pipes.

FIG. 13 shows that burial of pressure vessels under shallow water but in soils greater than 450 feet deep will bypass the need for ballast to cancel the buoyancy force.

FIG. 14 is a table that uses the calculation for the pressure drop in pipes that connect the pressure vessel output port to the turboexpander input port via a long distance from the offshore pressure vessel that requires horizontal length and vertical length. A pipe diameter between 2 and 3 inches was selected in accordance with the performance characteristics of a 1,000 kWe two-stage turboexpander/generator set.

Consider one detailed calculation of the UW-CAES system shown in FIG. 3 that consists of a wind turbine or photovoltaic panel, compressor, transfer pipe line, underwater but above sea floor pressure vessel, transfer pipe line and turboexpander/generator set.

For this detailed example consider the green source energy driving the compressor is a 2,000 kWe wind turbine that supplies constant electrical power to an 7-stage air compressor for 7.8 hours (FIG. 10).

The airflow from the on shore compressor to the pressure vessel located 1,125 feet off shore in water at 1,125 ft depth (500 psig hydrostatic pressure) flows though 16 pipes that are each 2.4 inches inside diameter. The 1,200 psig discharge pressure from the compressor will lose about 8 psig in frictional pressure drop. On the other hand there will be a pressure gain of 8 to 50 psig at the bottom of the pipe because of dense pressurized air.

The 2,000 kWe compression period for 7.8 hours combined with the 1,000 KW (electrical) and 1,000 kW (thermal) for 2.3 hours (FIG. 10) will require two reinforced concrete cylinders that contain the pressurized air within the 4 feet inside diameter cylinder, 935 feet long. Consider that the cylinder is oriented perpendicular to the shore line.

The advantage here is that the receiver end of the cylinder will be closest to the compressor so that the heat from the last stage of air compression will enter the pressure vessel over a short distance. Furthermore, the insulation wall material properties of the transmission line will deliver compressed air at high temperature. On the other hand the thermally conductive wall material of the transmission line from the pressure vessel to the onshore turboexpander will permit the colder and colder air from the pressure vessel to be warmed by the surrounding sea water through the metal transmission lines.

The buoyant force on the pressure vessel, even though it has thick concrete walls will still require ballast. Some of the ballast will consist of an array of radially oriented metallic rods (low tensile strength) across the thickness of the wall, where these rods will terminate on a thin walled metal liner within the concrete cylinder to enhance the inward flow of heat from the warm seawater as the interior expanding air becomes colder and colder.

In the alternate scenario wherein the pressure vessel is composed of high strength fiberglass, is less than 1 inches thick, and oriented vertically and inside the soil below the sea bottom, the buoyant force of the pressure vessel will be counteracted by the shear force that prevents pull out of the vertical cylinder. This will occur even though there is no ballast (FIG. 11). This configuration is particularly applicable to a shallow water zone where there is the capability to sink the cylinder deep below the sea bottom floor.

The metallic transmission pipeline system from the pressure vessel to the turboexpander/generator set onshore will consist of 64 2.4-inch inside diameter pipes (FIG. 14).

The turboexpander/generator set will provide 1,000 kW (electrical), 1,000 kW (thermal) and hot water (generated by the coolant water input).

We claim:

1. A compressed air energy storage system comprising:
   a. one or more pressure vessels installed underneath a seabed, each of the one or more pressure vessels having rigid walls extending from a bottom of the one or more pressure vessel to a top of the one or more pressure vessel, wherein the rigid walls comprise reinforced material;
   b. at least one air compressor in communication with the one or more pressure vessels, wherein the at least one air compressor is powered by one or more energy sources;
   c. a turboexpander having a plurality of outputs;
   d. at least one generator in communication with the turboexpander, wherein airflow from the turboexpander powers the at least one generator;
   e. a first thermally insulated transmission line extending from the at least one air compressor to inlets of the one or more pressure vessels; and
   f. a second transmission line extending from outlets of the one or more pressure vessels to the turboexpander, and wherein the second transmission line is comprised of a thermally conductive material to allow heat exchange with ambient air or ambient water.

2. The system of claim 1, further comprising at least one heat exchanger in communication with at least one of the plurality of outputs of the turboexpander, wherein the turboexpander cools compressed air from the one or more pressure vessels, and wherein cooled compressed air engages the at least one heat exchanger.

3. The system of claim 2, wherein the at least one energy source is a wind turbine or a photovoltaic panel.

4. The system of claim 2, wherein the at least one energy source is combustible fuel.

5. The system of claim 2, wherein the first transmission line comprises insulation material.

6. The system of claim 2 wherein another at least one heat exchanger is in communication with the at least one air compressor.

7. The system of claim 1, wherein the second transmission line is further comprised of multiple small diameter pipes in contact with the ambient water.

8. The system of claim 7, wherein the multiple small diameter pipes have an inner diameter of approximately 0.2 feet.

9. The system of claim 8, wherein the multiple small diameter pipes are comprised of stainless steel, and the second transmission line is comprised of 32-64 small diameter pipes.

10. A compressed air energy storage system comprising:
    a. one or more pressure vessels installed underwater, each of the one or more pressure vessels having rigid walls, wherein the rigid walls comprise reinforced material;
    b. at least one air compressor in communication with the one or more pressure vessels;
    c. a turboexpander having a plurality of outputs;
    d. at least one generator in communication with the turboexpander;
    e. a first thermally insulated transmission line extending from the at least one air compressor to inlets of the one or more pressure vessels; and
    f. a second transmission line extending from outlets of the one or more pressure vessels to the turboexpander, wherein the second transmission line is comprised of a plurality of pipes wherein the second transmission line is comprised of a thermally conductive material to allow heat exchange with ambient air or ambient water.

11. The system of claim 10, wherein the one or more pressure vessels are installed under the seabed.

12. The system of claim 10, wherein the one or more pressure vessels are anchored to the seabed.

13. The system of claim 10, wherein the first transmission line is comprised of a plurality of pipes.

14. The system of claim 13, wherein the at least one air compressor has an output of about 200 pounds per square inch gage, and wherein the first transmission line is comprised of approximately 16 pipes having an inner diameter of approximately 0.2 feet.

15. The system of claim 13, wherein the at least one air compressor has an output of about 1200 pounds per square inch gage, and wherein the first transmission line is comprised of approximately 4 pipes having an inner diameter of approximately 0.2 feet.

16. The system of claim 13, wherein the plurality of pipes of the second transmission line contains 32-64 pipes, and wherein the plurality of pipes is comprised of stainless steel.

17. A compressed air energy storage system comprising:
    a. one or more pressure vessels installed underwater, each of the one or more pressure vessels having rigid walls, wherein the rigid walls comprise reinforced material;
    b. at least one air compressor in communication with the one or more pressure vessels;
    c. a turboexpander having a plurality of outputs;
    d. at least one generator in communication with the turboexpander;
    e. at first transmission line comprising at least four insulated pipes extending from the at least one air compressor to inlets of the one or more pressure vessels, wherein the first transmission; and
    f. a second transmission line comprising at least 16 thermally conductive pipes extending from outlets of the one or more pressure vessels to the turboexpander, wherein the second transmission line is comprised of a plurality of pipes,
wherein the at least four insulated pipes of the first transmission line and the at least 16 thermally conductive pipes of the second transmission line have diameters of approximately 0.2 feet.

* * * * *